United States Patent
Ganjeh et al.

(10) Patent No.: US 9,213,951 B2
(45) Date of Patent: Dec. 15, 2015

(54) CAUSE-CHAIN ANALYSIS USING OBJECTS

(75) Inventors: Nima Ganjeh, Bellevue, WA (US); Craig V. McMurtry, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1073 days.

(21) Appl. No.: 12/612,680

(22) Filed: Nov. 5, 2009

(65) Prior Publication Data

US 2011/0107351 A1    May 5, 2011

(51) Int. Cl.
*G06F 3/00* (2006.01)
*G06F 9/44* (2006.01)
*G06F 9/46* (2006.01)
*G06F 13/00* (2006.01)
*G06Q 10/06* (2012.01)

(52) U.S. Cl.
CPC ..................................... *G06Q 10/06* (2013.01)

(58) Field of Classification Search
None
See application file for complete search history.

(56) References Cited

U.S. PATENT DOCUMENTS

| | | | |
|---|---|---|---|
| 6,282,175 B1 | 8/2001 | Steele et al. | |
| 7,065,767 B2 | 6/2006 | Kambhammettu et al. | |
| 7,197,502 B2 * | 3/2007 | Feinsmith | 1/1 |
| 7,203,624 B2 | 4/2007 | Warshawsky | |
| 2002/0169678 A1 * | 11/2002 | Chao et al. | 705/26 |
| 2004/0260678 A1 | 12/2004 | Verbowski et al. | |
| 2005/0144151 A1 | 6/2005 | Fischman et al. | |
| 2006/0143596 A1 * | 6/2006 | Miyashita et al. | 717/131 |
| 2008/0276253 A1 | 11/2008 | Khandrika et al. | |

OTHER PUBLICATIONS

"Track File and Registry Changes Made by an Application Installation", retrieved at <<http://www.winxptutor.com/tracker.htm>>, Dec. 9, 2004.
Leszak, et al., "A Case Study in Root Cause Defect Analysis", retrieved at <<http://ieeexplore.ieee.org/stamp/stamp.jsp?tp=&arnumber=870433&isnumber=18809>>, Proceedings of the 22nd international conference on Software engineering, 2000.

* cited by examiner

*Primary Examiner* — Craig Dorais
(74) *Attorney, Agent, or Firm* — Aneesh Mehta; Douglas Barker; Micky Minhas

(57) ABSTRACT

Identification of the root cause of a change in the system, as well as any side-effects ("ancillary changes") caused by the change via an object attribute. A change resulting from a request in a system, whether originating from a user, service, or workflow, has an associated request object that captures the details of the change. An ancillary change resulting from the prior change is correlated to the prior change through a parent attribute on the request object that identifies the prior change as the immediate parent. Thus, all downstream ancillary changes resulting from a request can be correlated back to the root request (change) via the parent attributes of the ancillary changes.

20 Claims, 9 Drawing Sheets

CAUSE-CHAIN ANALYSIS USING OBJECTS

BACKGROUND

The troubleshooting of hardware and software systems continues to be a complex and time-consuming endeavor. A change in the system can have a cascade effect that results in a chain of changes or events in the system. For auditing and reporting purposes, it is typically a requirement to identify the root cause of a change in the system, as well as identifying the effects of the change in the system. Without the ability to link related changes together, it is not possible to produce a cause-chain and identify the root cause of a change in the system. This becomes particularly concerning in an identity management system, for example, that inter alia identifies and authenticates service providers against phishing attacks.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the identification of the root cause of a change in the system, as well as any side-effects ("ancillary changes") caused by the change. A change is a result of a request being generated and processed. Every change resulting from a request in a system, whether originating from a user, service, or workflow, has an associated request object that captures the details of the change. A subsequent change resulting from a prior request is correlated to the prior request through a parent attribute on the request object that identifies the prior request as the immediate parent. Thus, all downstream changes resulting from a request can be correlated back to the request via the parent attributes to that request. Moreover, all downstream changes created as a result of the request can be related back to the request based on the parent attributes in the request objects of the downstream changes. The ability to trace back in time from a last change to the initial (or root) request provides the capability to find the root cause of a change in the system.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
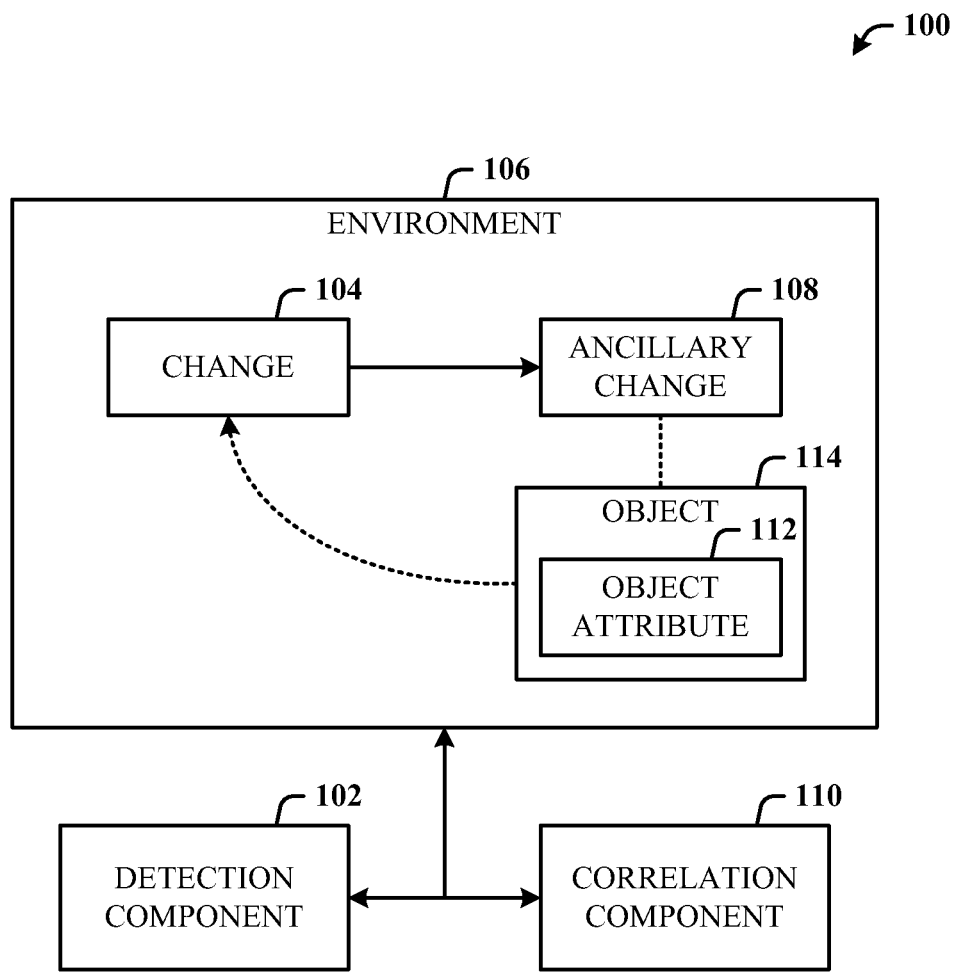
FIG. 1 illustrates a computer-implemented change management system in accordance with the disclosed architecture.

The disclosed architecture enables the identification of the root cause of a change in the system, as well as ancillary changes caused by a given change. The architecture provides correlation of a request in the system for a change to all other ancillary requests that resulted from it, through the use of an attribute on a request object that represents the request. Additionally, correlation is also provided of the ancillary request to the request that triggered it, through the use of the attribute on the request object. The architecture captures changes in the system as request objects and provides a correlation (via the attribute) between the request object and the parent request to the request object.

The architecture finds particular application to identity management systems such as for account management (accounts and access administration for network services and computers), organizational profiling of user data (managing and leveraging statistical user information), and user self-management (personal data such as in social networks).

The disclosed architecture facilitates a view to the changes to objects. Regular audits of security groups can be performed. Scheduled reports can be generated which display each change to security group owners and members in a recent time period (e.g., the last six months), and when a given change occurred.

Additionally, another application provides for reporting all changes to user accounts (e.g., in the last month) and the source of the changes. User updates can be the result of workflows, while other user updates can be changes made directly by other users. A report can be generated that displays each change to user accounts in the last month, for example, as well as the request that caused the change. Hence, the user can review changes of interest and the requests that caused the changes. From a request, the user can identify the employee, request, or policy that triggered the change, and what other workflows resulted from the request.

Other support can be provided to identify the cause of a dynamic membership change. Here for example, a user needs to report on new members that were added to a network administration dynamic security group over the last month, and what caused the members to enter the group. The user can generate a report that displays each membership change to the group in the last month. The user finds that an employee, Employee, was added to the group last week.

By observing a membership filter of the dynamic group as it existed last week, the user can determine that the criteria that led to Employee entering the group is that Employee's job title was Network Administrator and that Employee was in the Network Administration department. To identify the requests that caused Employee to satisfy the group's membership criteria, the user can generate a report of all changes to Employee's Job Title and Department. From this report, the user is able to see when Employee's Job Title and Department were modified such that these properties met the group's criteria, and the cause of the changes.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented change management system 100 in accordance with the disclosed architecture. The system 100 includes a detection component 102 that detects a change 104 in an environment 106 and an ancillary change 108 in the environment 106. The ancillary change 108 occurs as a consequence of the change 104. The system 100 can further comprise a correlation component 110 that correlates the ancillary change 108 to the change 104 via an object attribute 112. This is represented by a dotted arrow from the object attribute 112 to the change 104. The object attribute 112 is implemented as part of a request object 114 associated with the resulting change.

Each change in the environment 106 that is requested or committed has a request object (e.g., object 114) associated with it. This includes changes submitted by users of the environment 106 (e.g., system), changes submitted by workflows, as well as the environment 106 itself. This means that any data in the environment 106 can be linked back to the request (for the change 104) that caused the data to enter the environment 106. Requests that originated as a result of other requests, referred to as "ancillary" requests (or resulting requests), in the environment 106 can be identified based on a parent request attribute (e.g., object attribute 112) on the request object (e.g., object 114). The parent request attribute identifies the parent request that caused the current request to be submitted. By following the chain of requests identified by the parent request attribute, users can identify the entire chain of requests and changes that took place as a result of the root request. This allows auditors to gain an understanding of the cause of a change in the environment 106 by simply following the parent request link.

Figure 2:
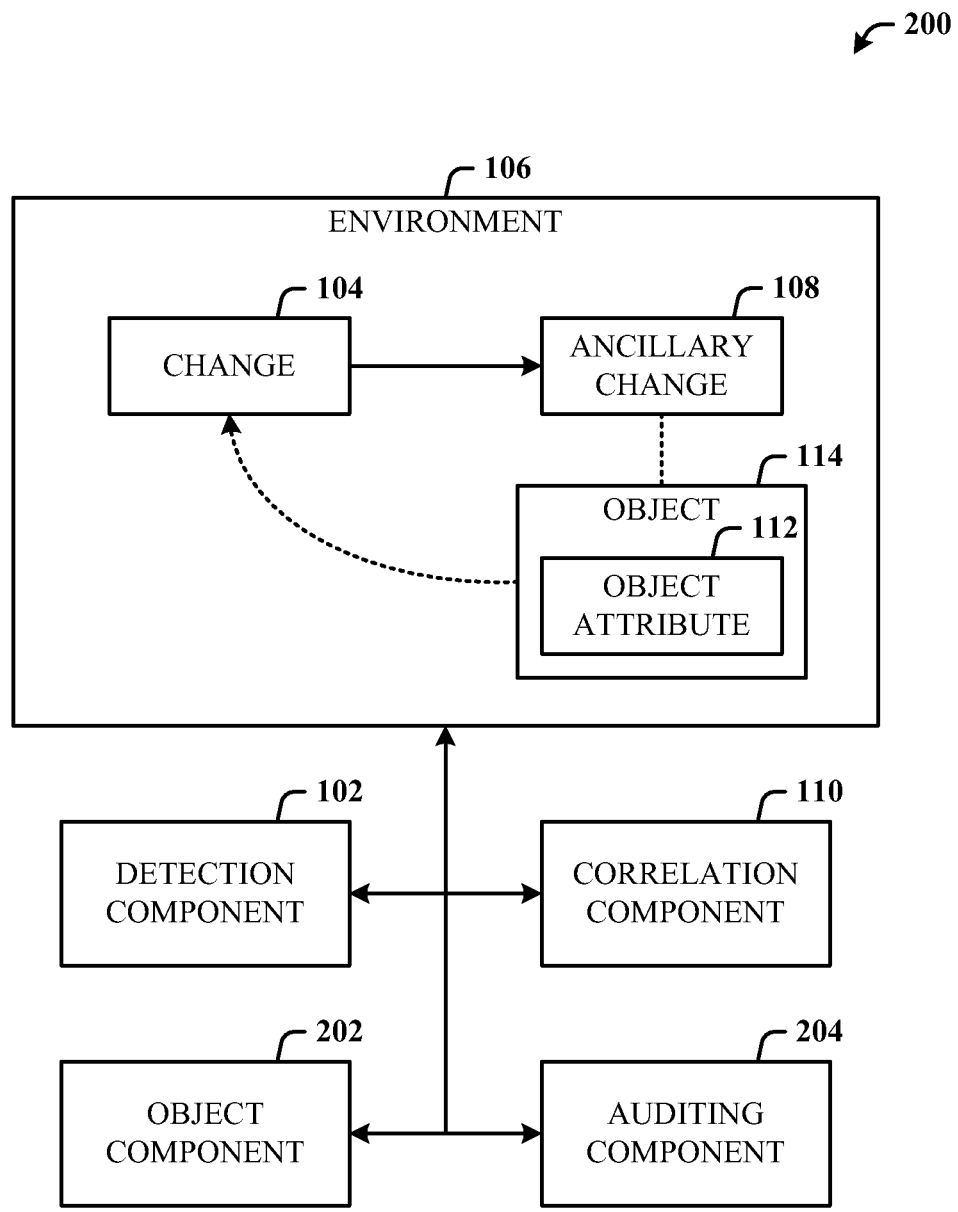
FIG. 2 illustrates an alternative embodiment of a change management system that employs an auditing capability.

FIG. 2 illustrates an alternative embodiment of a change management system 200 that employs an auditing capability. The system 200 can include the entities (e.g., change 104) and components (e.g., correlation component 110) of the system 100 of FIG. 1, as well as an object component 202 and auditing component 204. The object component 202 creates objects and request objects for changes detected in the environment 106. The auditing component 204 facilitates the auditing of some or all changes in the environment 106 according to a time span. This auditing functionality then further provides the capability to determine the change 104 as a root cause based on correlation of the ancillary change 108 to the change 104 using the object attribute 112.

By associating all user, workflow, and environment driven changes to requests, auditors can identify the real root cause of the change such as a management policy that triggered the change, and any collateral processes that resulted from the change. The request object associated with a change captures all the details of the change. All changes on objects for a given time range (span), along with the cause of the change can be easily retrieved. Furthermore, there is only ever one object type users will expect as the cause of a change, thereby simplifying how the users think about changes in the environment.

Put another way, the system 200 comprises the detection component 102 that detects the change 104 in a system and ancillary changes occurring in response to the change 104, the object component 202 that creates a request object 114 in association with the change 104, the correlation component 110 that correlates the ancillary changes to the change 104 via corresponding object attributes associated with the ancillary changes.

The auditing component audits one or more changes in an environment based on object attributes associated with changes and ancillary changes. The auditing component facilitates determination of the change as a root cause based on correlation of the ancillary change to the change using the object attribute. The detection component 102, correlation component 110, auditing component 204 and/or object component 202 can be part of an identity management system. At least one of the change or the ancillary change is triggered by a management policy.

Figure 3:
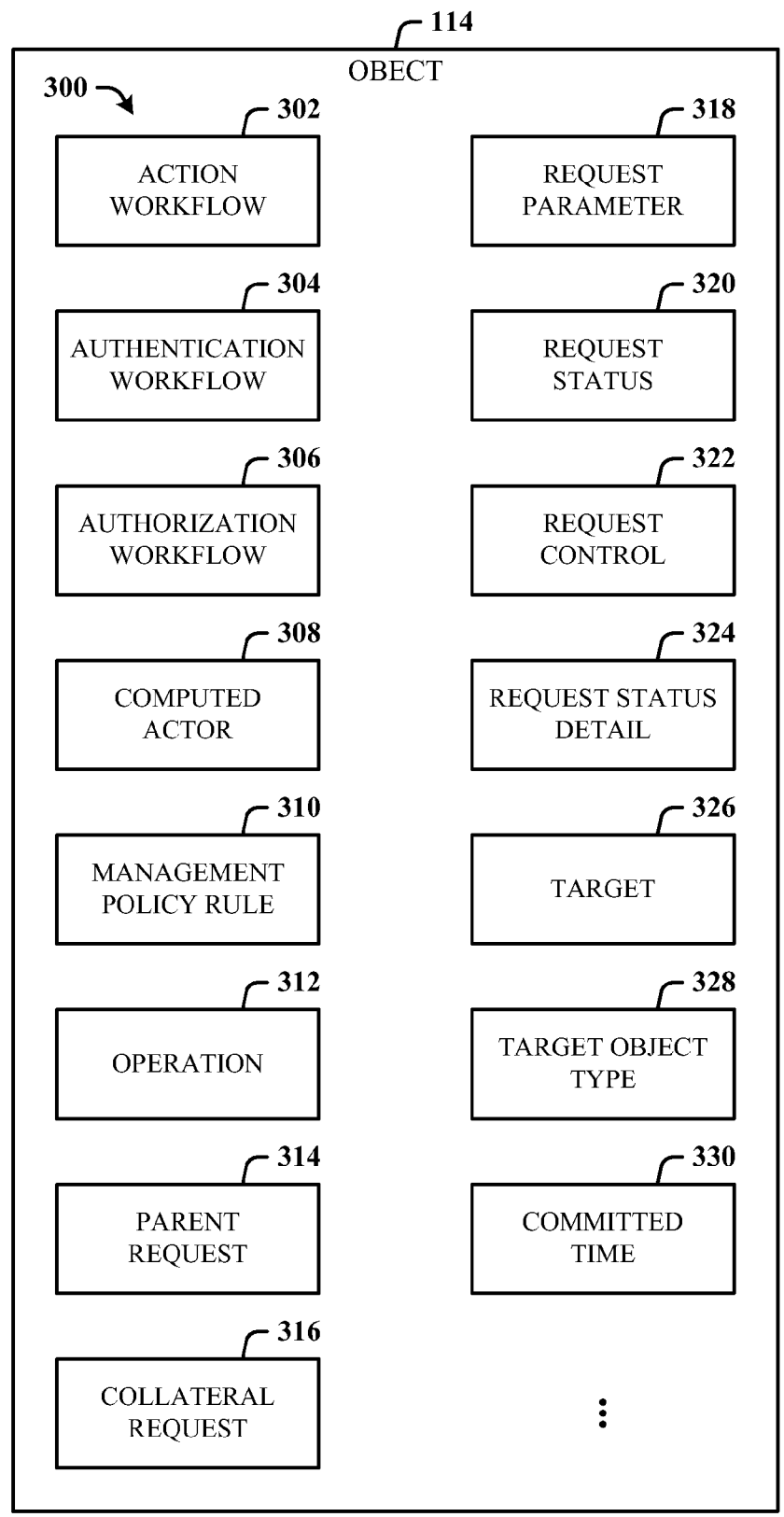
FIG. 3 illustrates an exemplary set of attributes for the object associated with a change and resulting or ancillary change.

FIG. 3 illustrates an exemplary set of attributes 300 for the object associated with a change and resulting or ancillary change. An action workflow attribute 302 is a reference to all action workflow instances that were launched. An authentication workflow attribute 304 is a reference to all AuthN workflow instances that were launched. An authorization workflow attribute 306 is a reference to all AuthZ workflow instances that were launched. A computed actor attribute 308 is a list of resolved approvers and is populated by activities, and can be used to setup rights, as appropriate.

A management policy rule attribute 310 is a reference to all management policy objects affected by this request object, and is calculated at the beginning of the process. When a change occurs, the change can trigger one or more policies that further cause the creation of ancillary changes. By following the parent attributes of the request objects, the user can trace back to the change that caused or was at the root of the problem or outcome.

An operation attribute 312 is the operation that the request is trying to perform. Valid values can be Create, Read, Update, Delete, Enumerate, and SystemEvent. A parent request attribute 314 is a reference to the request object that directly triggered the creation of this request. The only case where a parent request will exist is when a request triggers a workflow which as a result creates another request. An example scenario is the following: a user creates a request, Request A, to create a new user account. Request A triggers an action workflow that creates a new request, Request B, which further updates the new user's expected rules list with a new synchronization rule that provisions the new user to a directory service. The parent request of Request B is Request A. If Request A had triggered another request, Request C, then Request C's parent request would be Request B.

A collateral request attribute 316, if a value of True, indicates that collateral (ancillary) requests exist, and if a value of False, indicates that all action workflows for the current request are on the current target. This attribute can be made only visible to members of an administrator set, by default. A request parameter attribute 318 can be written by a request dispatcher and contains normalized representation of a SOAP (simple object access protocol) body. A request status attribute 320 is the status of the request's action workflows and collateral requests.

A request control attribute 322 allows a client to control the execution of a request based on values provided for the attribute. A request status detail attribute 324 can be used for any feedback to the requestor. This can be an error message or information an activity sends to the requestor. A target attribute 326 is a reference to a target object to which the operation refers. A target object type attribute 328 is resolved to the objectType found in the parameters section, and can be used by end-users to filter for specific requests from the portal. A committed time attribute 330 is date/time data that indicates when the request's CRUD (create, read, update, delete) operation was actually committed to the database. The composition of the object attributes 300 can include some, all, or other attributes as desired.

Figure 4:
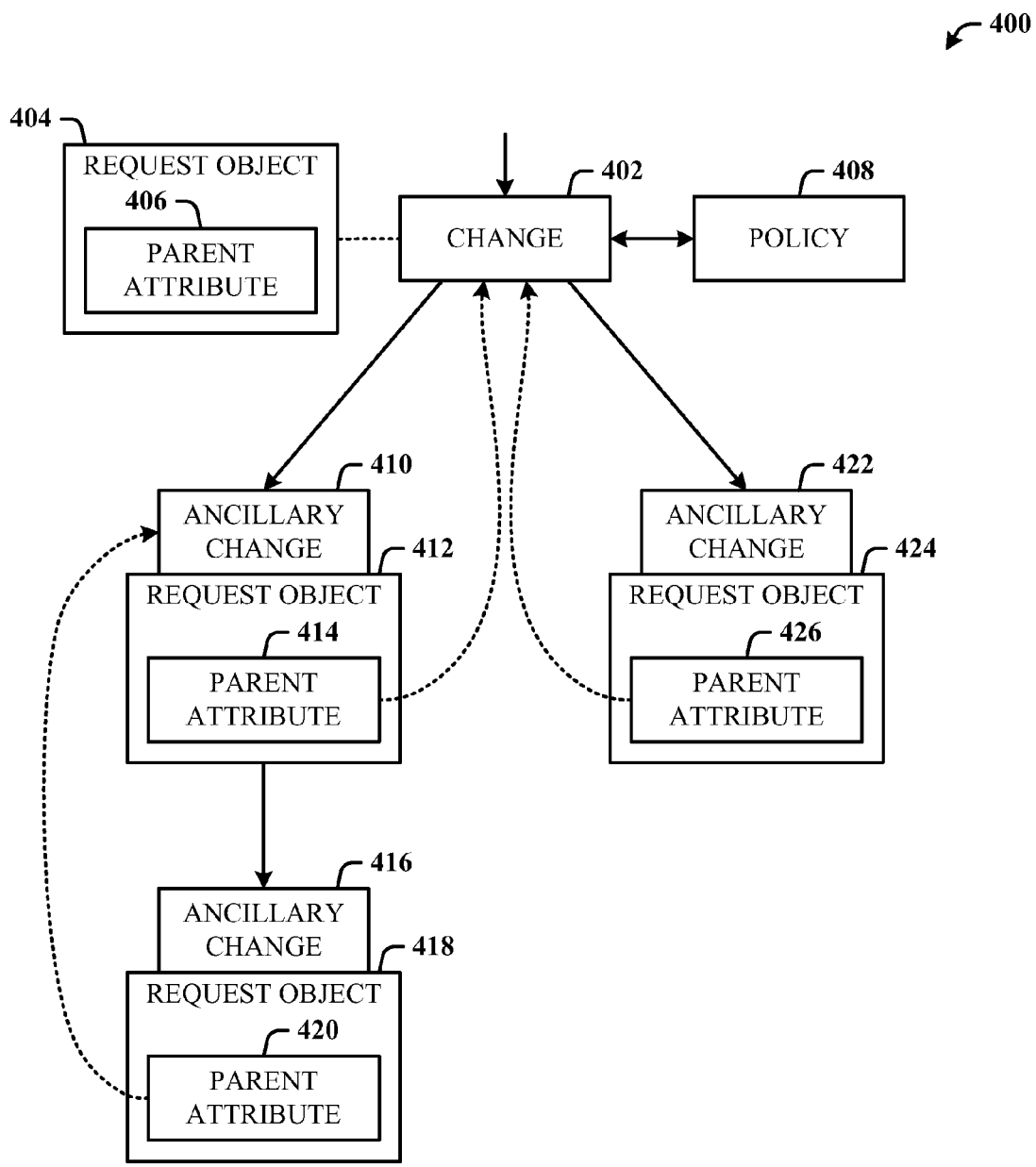
FIG. 4 illustrates a flow diagram for serial and parallel change generation from a change.

FIG. 4 illustrates a flow diagram 400 for serial and parallel change generation from a change 402. The change 402 is associated with a request object 404 and parent attribute 406. The parent attribute 406 will point to a previous change (not shown) that precedes the change 402. Alternatively, the change 402 is not generated as a result of a preceding change, in which case the parent attribute 406 of the change 402 points to the current target.

Here, a policy 408 executes according to the change 402 causing ancillary changes to be spawned. For example, a first ancillary change 410 has an associated first request object 412 and a first parent attribute 414. The first parent attribute 414 references the change 402 as its parent. The first ancillary change 410 causes a second ancillary change 416 to occur. The second ancillary change 416 has an associated second request object 418 and second parent attribute 420. Since the second ancillary change 416 is a child to the first ancillary change 410, the second parent attribute 420 references the first ancillary change 410.

In a parallel manner, the policy 408 triggered by change 402 causes a third ancillary change 422 to occur. The third ancillary change 422 has an associated third request object 424. The third request object 424 includes a third parent attribute 426 that references the change 402, since the third ancillary change 422 is a child to the change 402. Note that the second ancillary change 416 can occur in response to an ancillary policy (not shown) that is processed when the first ancillary change 410 occurs; however, this is not a requirement, since policies can be associated with a single change, groups of changes, or no changes at all.

When auditing is performed, all the ancillary changes (410, 416 and 422) can be retrieved, along with the corresponding parent attributes (414, 420, and 426), if the ancillary changes (410, 416 and 422) and attributes (414, 420, and 426) fall within a specified time period. The audit will then reveal that the change 402 is the root cause of the ancillary changes (410, 416 and 422). Moreover, the request that caused the change 402, as well as the policy 408 can be revealed. Note that the disclosed architecture applies to client systems, server systems, and distributed systems as well.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
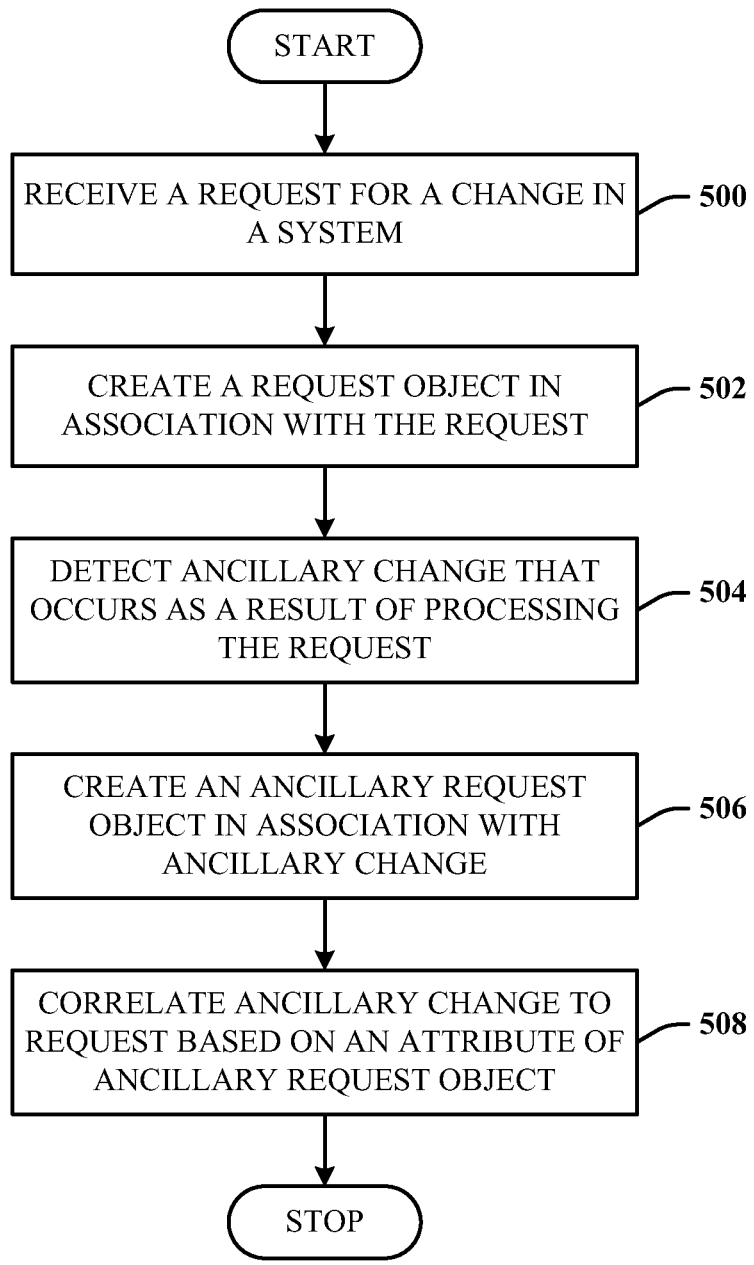
FIG. 5 illustrates a computer-implemented change management method.

FIG. 5 illustrates a computer-implemented change management method. At 500, a request for a change is received in a system. At 502, a request object is created in association with the request. At 504, an ancillary change is detected that occurs as a result of processing the request. At 506, an ancillary request object is created in association with the ancillary change. At 508, the ancillary change is correlated to the request based on an attribute of the ancillary request object.

Figure 6:
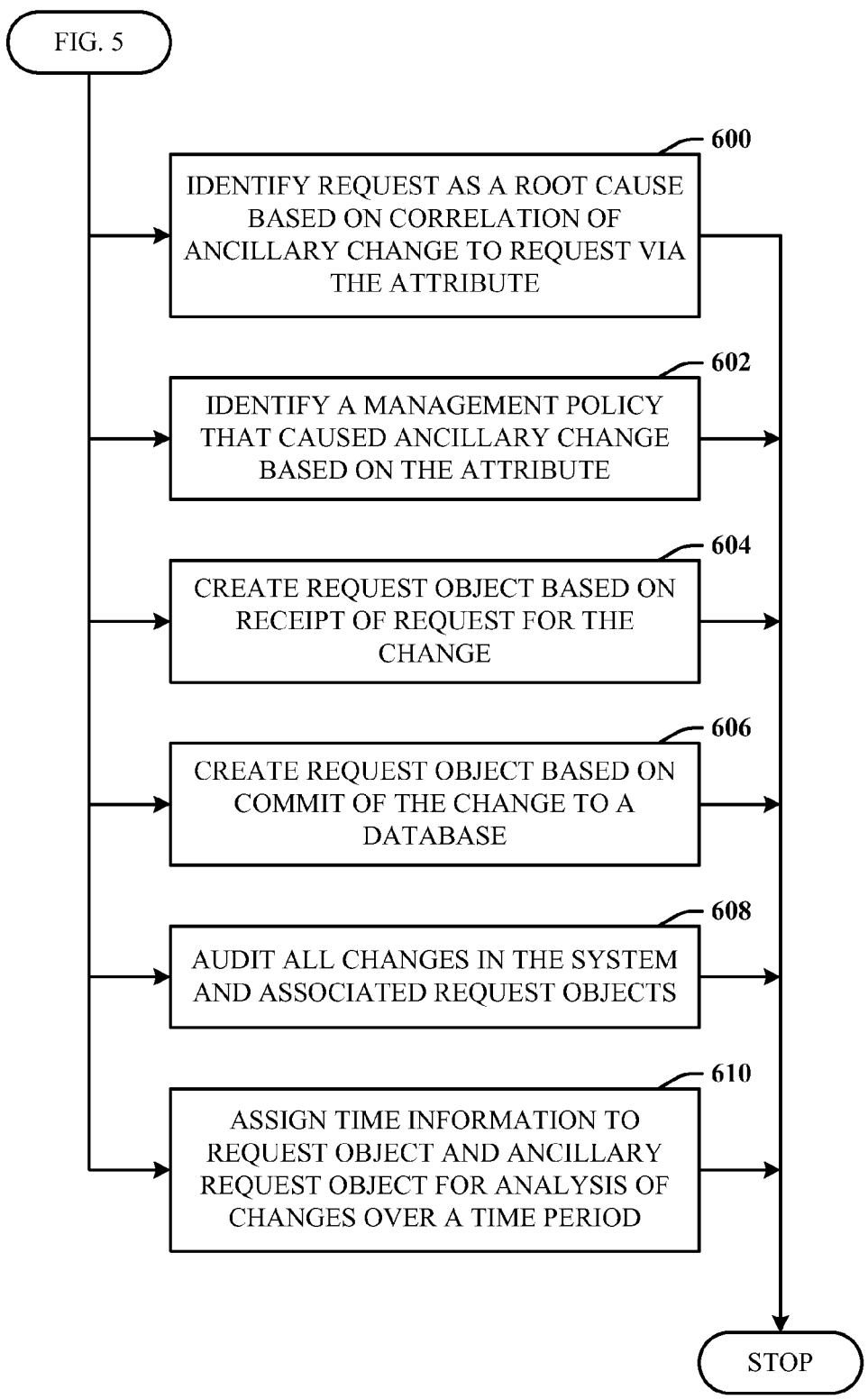
FIG. 6 illustrates additional aspects of the method of FIG. 5.

FIG. 6 illustrates additional aspects of the method of FIG. 5. At 600, the request is identified as a root cause based on correlation of the ancillary change to the request via the attribute. At 602, a management policy is identified that caused the ancillary change based on the attribute. At 604, the request object is created based on receipt of the request for the change. At 606, the request object is created based on commit of the change to a database. At 608, all changes in the system and associated request objects are audited. At 610, time information is assigned to the request object and the ancillary request object for analysis of changes over a time period.

Figure 7:
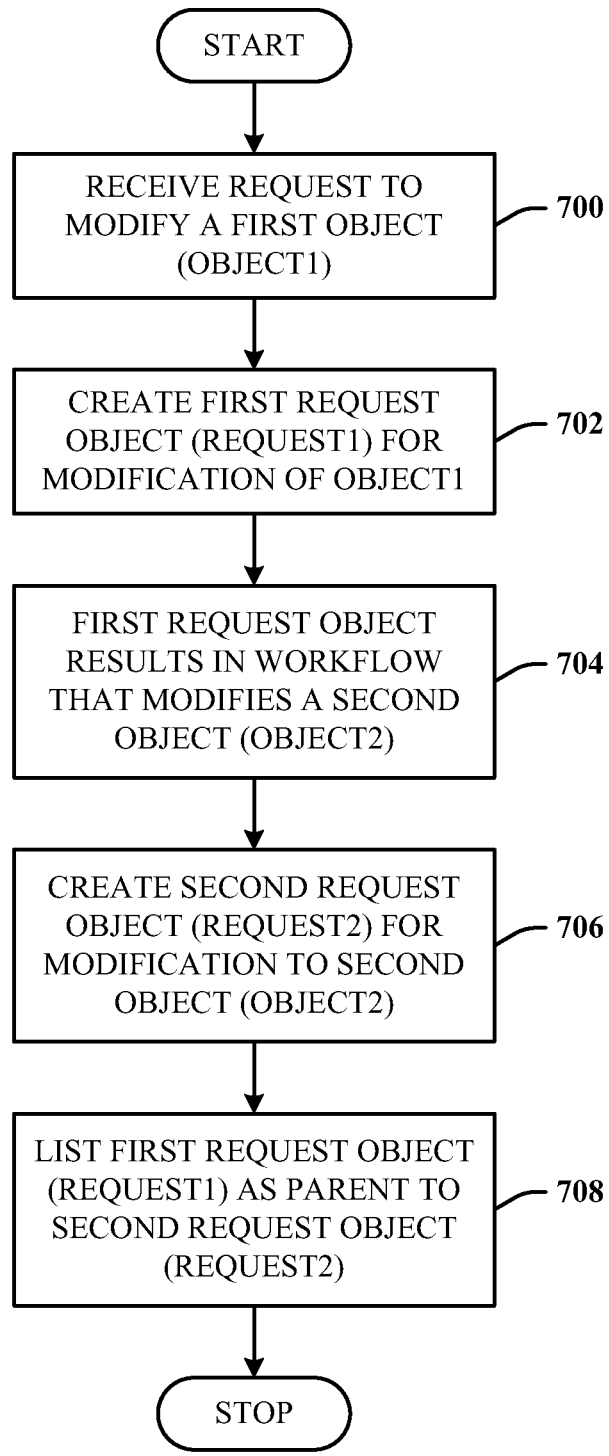
FIG. 7 illustrates a more specific method of change management.

FIG. 7 illustrates a more specific method of change management. The flow diagram represents, at a high level, the sequence of actions taken by the system to link requests in the system to the requests that caused them. At 700, a request is received to modify a first object (Object1). At 702, a first request object (Request1) is created for modifications to the first object (Object1). At 704, the first request object (Request1) results in a workflow that modifies a second object (Object2). At 706, a second request object (Request2) is created for modifications to the second object (Object2). At 708, the first request object (Request1) is listed as a parent to the second request object (Request2).

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
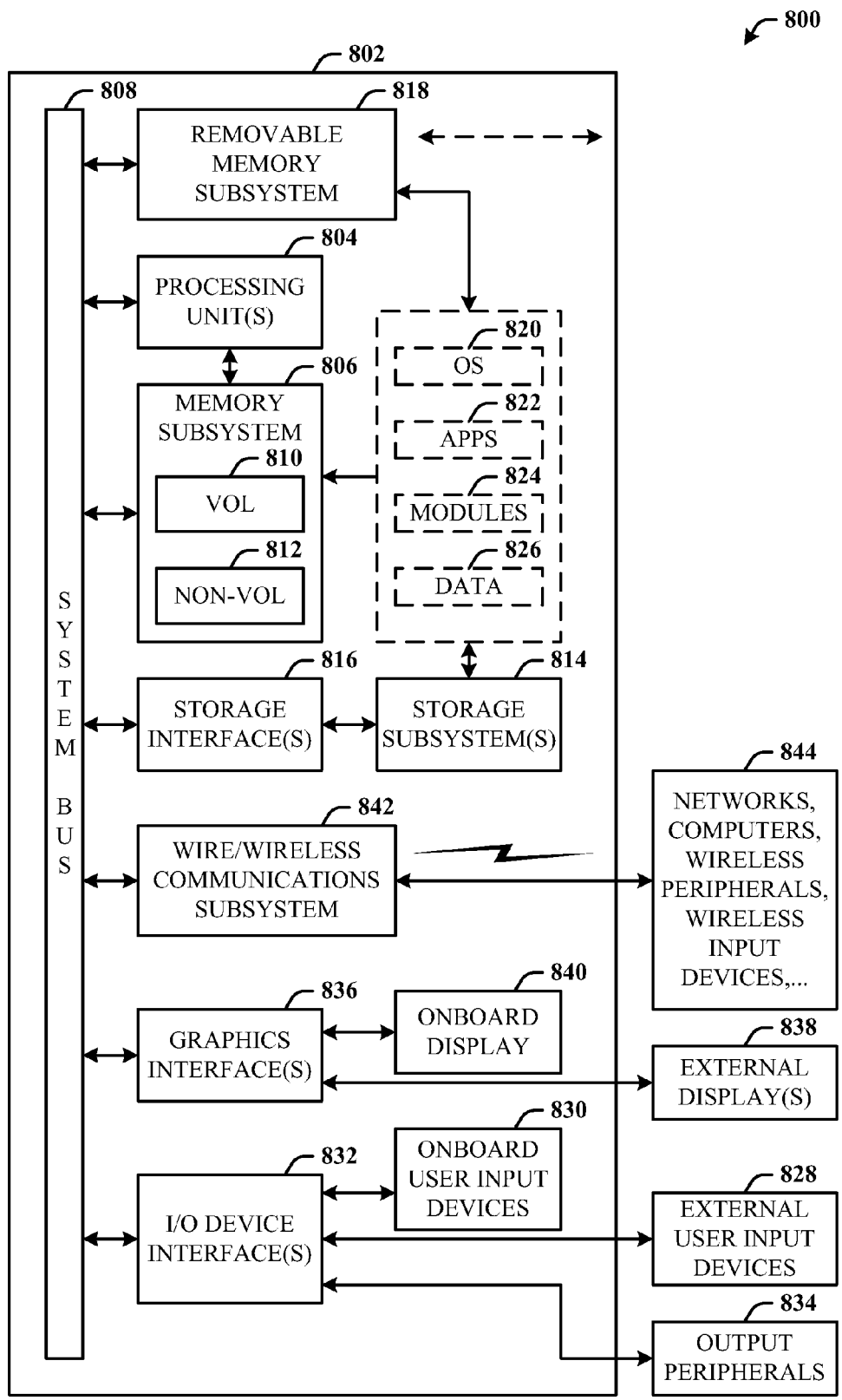
FIG. 8 illustrates a block diagram of a computing system operable to execute change management in accordance with the disclosed architecture.

Referring now to FIG. 8, there is illustrated a block diagram of a computing system 800 operable to execute change management in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, the attributes 300 of FIG. 3, the diagram 400 of FIG. 4, and the methods of FIGS. 5-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 9:
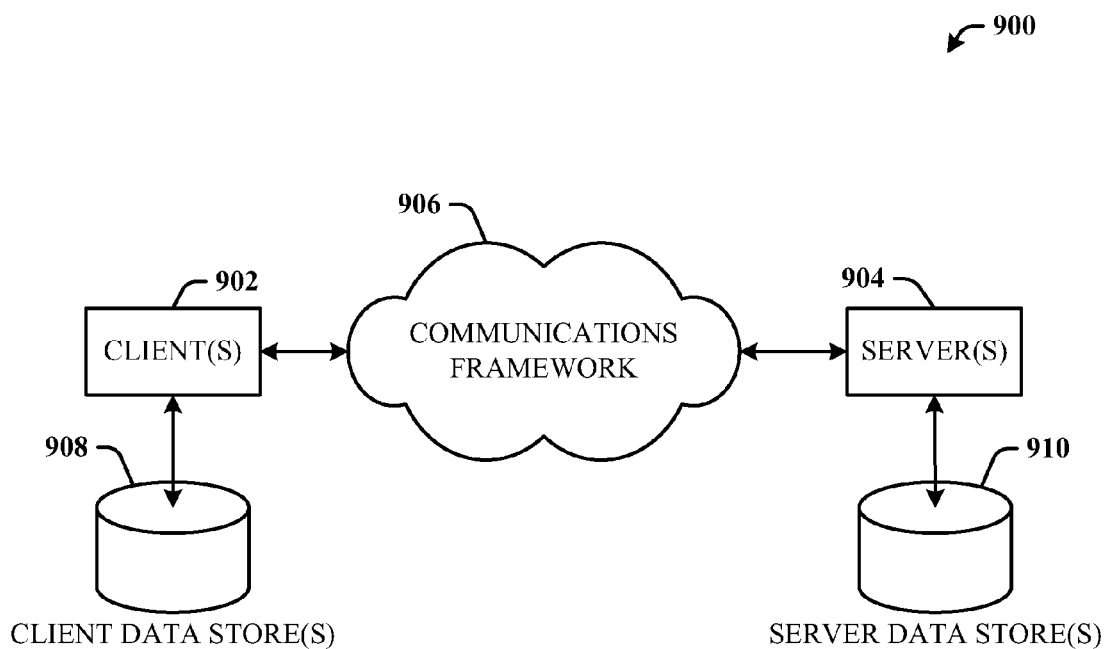
FIG. 9 illustrates a schematic block diagram of a computing environment that employs the disclose change management architecture.

Referring now to FIG. 9, there is illustrated a schematic block diagram of a computing environment 900 that employs the disclose change management architecture. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented change management system, comprising:
   a request object created in response to and associated with a change in an environment, the request object related to a request that caused the change and comprising a parent attribute that points to a previous change, thereby enabling the request object to capture details of the change, the request causes ancillary requests associated with ancillary changes and ancillary request objects created for the ancillary changes, the ancillary request objects comprising respective ancillary parent attributes that reference the change as parent of the ancillary changes, the ancillary changes captured in respective ancillary request objects;
   a correlation component configured to correlate ancillary changes that result from the change via the corresponding parent object, to determine the request associated with the change as a root cause of all changes in the environment; and
   a microprocessor that executes computer-executable instructions in a memory associated with the creation of the request object and the correlation component.

2. The system of claim 1, further comprising an auditing component configured to audit one or more changes in an environment based on object attributes associated with request objects of the changes and ancillary changes.

3. The system of claim 2, wherein the auditing component facilitates determination of the request that caused the change and the ancillary changes as the root cause based on correlation of the ancillary changes to the change using the parent object attributes.

4. The system of claim 1, further comprising a detection component configured to detect the change as part of the environment and the ancillary changes in the environment, the ancillary changes occurring as a consequence of the change.

5. The system of claim 4, wherein the detection component and correlation component are part of an identity management system for account management related to accounts and access administration for network services and computers.

6. The system of claim 1, wherein the ancillary changes are triggered by a management policy affected by the request.

7. The system of claim 1, wherein the ancillary change is captured in an associated ancillary request object, the ancillary request object references the change via the object attribute.

8. A computer-implemented change management system, comprising:
   a detection component configured to detect a change in a system and ancillary changes occurring in response to the change;
   an object component configured to create a request object in association with and in response to the change the request object comprising a parent attribute that points to a previous change, the request object relates to a request that caused the change, and creates ancillary request objects for the ancillary changes, the ancillary changes captured in respective ancillary request objects, an ancillary request object relates to the request object by a respective ancillary parent object attribute that references the change as the parent of the respective ancillary change;
   a correlation component configured to correlate the ancillary changes to the change via the corresponding object attributes associated with the ancillary changes, to determine the request associated with the change as a root cause of the change and the ancillary changes in the system; and
   a microprocessor that executes computer-executable instructions in a memory associated with the creation of the detection component, object component, and the correlation component.

9. The system of claim 8, further comprising an auditing component configured to audit one or more changes in the system based on object attributes associated with changes and ancillary changes.

10. The system of claim 9, wherein the auditing component facilitates determination of the request associated with the change as a root cause based on correlation of the ancillary changes to the change using the object attributes.

11. The system of claim 10, wherein the detection component, correlation component, and auditing component are part of an identity management system for account management and access administration for network services.

12. The system of claim 8, wherein one of the ancillary changes is triggered by a management policy affected by the request.

13. The system of claim 8, wherein an ancillary change references the change via a parent object attribute.

14. A computer-implemented change management method, comprising acts of:
receiving a request for a change in a system;
creating a request object in association with the change caused by the request, the request object including an object attribute for identifying a previous change that caused the change in the system;
detecting an ancillary change that occurs as a result of the change and of processing the request;
creating an ancillary request object in association with the ancillary change, having a parent object attribute that references the change as the cause of the respective ancillary change;
correlating the ancillary change to the request based on the parent object attribute of the ancillary request object; and
utilizing a microprocessor that executes instructions stored in a memory associated at least with one of the acts of creating a request object, detecting, creating an ancillary request object, or correlating.

15. The method of claim 14, further comprising identifying the request as the root cause based on correlation of the ancillary request object to the request object via the attribute.

16. The method of claim 14, further comprising identifying a management policy affected by the request that caused the ancillary change based on the attribute.

17. The method of claim 14, further comprising creating the request object based on receipt of the request for the change.

18. The method of claim 14, further comprising creating the request object based on commit of the change to a database.

19. The method of claim 14, further comprising auditing all changes in the system and associated ancillary request objects and request objects.

20. The method of claim 14, further comprising assigning time information to the request object and the ancillary request object for analysis of changes over a time period.

* * * * *